United States Patent
Hills

(10) Patent No.: US 8,056,887 B2
(45) Date of Patent: Nov. 15, 2011

(54) APPARATUS FOR SURFACE MIXING OF GASSES AND LIQUIDS

(76) Inventor: Blair H. Hills, Charleston, WV (US)

(*) Notice: Subject to any disclaimer, the term of this patent is extended or adjusted under 35 U.S.C. 154(b) by 1235 days.

(21) Appl. No.: 11/668,856

(22) Filed: Jan. 30, 2007

(65) Prior Publication Data

US 2007/0200261 A1 Aug. 30, 2007

Related U.S. Application Data

(60) Provisional application No. 60/763,257, filed on Jan. 30, 2006.

(51) Int. Cl.
*B01F 3/04* (2006.01)

(52) U.S. Cl. ............................ 261/91; 261/120; 261/123

(58) Field of Classification Search .................... 261/84, 261/91, 92, 93, 120, 123
See application file for complete search history.

(56) References Cited

U.S. PATENT DOCUMENTS

| | | | |
|---|---|---|---|
| 2,063,301 A | 12/1936 | Durdin, Jr. | |
| 2,145,034 A | 1/1939 | Widdis | |
| 2,293,183 A | 8/1942 | Walker | |
| 3,473,790 A * | 10/1969 | Herbert et al. | 261/91 |
| 3,515,375 A * | 6/1970 | Roos | 366/263 |
| 3,532,327 A | 10/1970 | Landberg | |
| 3,606,273 A | 9/1971 | Johnson | |
| 3,630,498 A | 12/1971 | Bielinski | |
| 3,643,403 A | 2/1972 | Speece | |
| 3,677,528 A | 7/1972 | Martin | |
| 3,771,724 A | 11/1973 | Rose et al. | |
| 3,775,307 A | 11/1973 | McWhirter et al. | |
| 3,810,546 A | 5/1974 | Oxenham | |
| 3,846,516 A | 11/1974 | Carlson | |
| 3,856,272 A | 12/1974 | Ravitts | |
| 3,911,064 A | 10/1975 | Whirter et al. | |
| 4,064,403 A | 12/1977 | Miller | |
| 4,086,306 A * | 4/1978 | Yoshinaga | 261/93 |
| 4,095,918 A | 6/1978 | Mouton, Jr. et al. | |
| 4,231,974 A | 11/1980 | Engelbrecht et al. | |
| 4,242,289 A | 12/1980 | Blum | |
| 4,358,206 A | 11/1982 | Schutte | |

(Continued)

FOREIGN PATENT DOCUMENTS

EP 1 243 313 A2 9/2002

(Continued)

OTHER PUBLICATIONS

"Deep Tank Aeration with Blower and Compressor Considerations," Aeration: Principles and Practice, pp. 147-197, 2007.

(Continued)

*Primary Examiner* — Charles Bushey
(74) *Attorney, Agent, or Firm* — Alan G. Towner, Esq.; Matthew W. Gordon, Esq.; Pietragallo Gordon Alfano Bosick & Raspanti, LLP

(57) ABSTRACT

A surface aerator for mixing gas and liquid is disclosed. The surface aerator has an upwardly pumping impeller located within a draft tube. A flow diverter redirects pumped liquid from the impeller traveling in an upward direction to a radially outward direction where it impacts and aerates the remaining liquid in a vessel. A baffle extends radially at a shallow depth to a point beyond the impact area of the liquid to provide separation of the impact area from the rest of the liquid and promote aeration.

5 Claims, 3 Drawing Sheets

U.S. PATENT DOCUMENTS

| | | |
|---|---|---|
| 4,371,480 A | 2/1983 | Vos |
| 4,465,645 A | 8/1984 | Kaelin |
| 4,512,936 A | 4/1985 | Oshima et al. |
| 4,519,715 A | 5/1985 | Golobic et al. |
| 4,532,038 A | 7/1985 | Reid |
| 4,611,681 A | 9/1986 | Krude et al. |
| 5,043,104 A | 8/1991 | Stirling |
| 5,112,192 A | 5/1992 | Weetman |
| 5,413,765 A | 5/1995 | Smith et al. |
| 5,431,860 A | 7/1995 | Kozma et al. |
| 5,525,269 A | 6/1996 | Connolly et al. |
| 5,676,889 A | 10/1997 | Belgin |
| 5,707,562 A * | 1/1998 | Karliner .......... 261/91 |
| 5,711,902 A | 1/1998 | Hsu |
| 5,755,976 A | 5/1998 | Kortmann |
| 5,785,899 A | 7/1998 | Young |
| 5,874,003 A | 2/1999 | Rose |
| 5,916,491 A | 6/1999 | Hills |
| 5,921,745 A | 7/1999 | Round et al. |
| 5,925,290 A | 7/1999 | Hills |
| 5,996,977 A | 12/1999 | Burgess |
| 6,017,020 A | 1/2000 | Baughman |
| 6,024,623 A | 2/2000 | Menow et al. |
| 6,077,424 A | 6/2000 | Katsukura et al. |
| 6,135,430 A | 10/2000 | Bergman, Jr. et al. |
| 6,145,815 A | 11/2000 | Cheng et al. |
| 6,273,402 B1 | 8/2001 | Cheng |
| 6,464,210 B1 | 10/2002 | Teran et al. |
| 6,533,244 B1 | 3/2003 | Falkner |
| 6,877,959 B2 | 4/2005 | McWhirter |
| 7,083,324 B2 | 8/2006 | Van Drie |
| 7,267,328 B2 * | 9/2007 | Witheridge .......... 261/77 |
| 7,398,963 B2 | 7/2008 | Hills |
| 7,789,553 B2 * | 9/2010 | Tormaschy et al. ........ 366/262 |
| 2004/0055960 A1 * | 3/2004 | McNeill .......... 210/721 |
| 2007/0200262 A1 | 8/2007 | Hills |

FOREIGN PATENT DOCUMENTS

| | | |
|---|---|---|
| FR | 2 798 602 A1 | 3/2001 |
| JP | 04197496 | 7/1992 |

OTHER PUBLICATIONS

"Surface and Mechanical Aeration," Aeration: Principles and Practice, pp. 199-240, 2007.

J. R. McWhirter et al., "Oxygen Mass Transfer Fundamentals of Surface Aerators," Ind. Eng. Chem. Res., vol. 34, No. 8, 1995, pp. 2644-2654.

* cited by examiner

APPARATUS FOR SURFACE MIXING OF GASSES AND LIQUIDS

CROSS REFERENCE TO RELATED APPLICATION

This invention claims the benefit of U.S. Provisional Application Ser. No. 60/763,257 filed Jan. 30, 2006. This application is related to U.S. application Ser. No. 11/668,816, filed Jan. 30, 2007 to Blair Howard Hills. Both of which are herein incorporated by reference.

FIELD OF THE INVENTION

The present invention relates to gas and liquid mixers for use in various applications such as wastewater systems, chemical reactors, mass transfer systems and the like.

BACKGROUND INFORMATION

Gas-liquid mixing systems are conventionally used for many purposes, such as the mass transfer of gases into and/or out of liquids. Oxidation and reduction reactions often require that a gas, such as oxygen, chlorine or hydrogen, be mixed with liquids in the presence of solids. Unwanted gases dissolved in liquids can be stripped from the liquid by mixing a desired gas into the liquid. Direct contact heating of a liquid requires that a hot gas be mixed into a liquid, and, in some instances, the pH of a liquid can be adjusted by mixing a gaseous acid or base into the liquid.

For example, oxygen gas is often mixed with various liquids. Oxygen gas can be mixed with activated sludge to aerate waste material and assist in digestion, it can be used to oxidize carbon, sulfur and/or nitrogen containing material in a liquid, it can also be mixed with liquids containing organic compounds to oxidize the organic compounds into alcohols, aldehydes and acids, or it can be mixed with hydrometallurgical process liquids to achieve various desired effects. Oxygen gas can also be mixed with liquids to reduce nitrogen-containing compounds into nitroso-containing materials, nitrites and/or nitrates. Oxygen gas can be mixed with liquids to reduce sulfur-containing compounds into disulfides, sulfoxides and/or sulfates.

The formation of hydrogen sulfide can occur in any aquatic based system

The formation of hydrogen sulfide can occur in any aquatic based system containing sulfates in which the dissolved oxygen does not meet the oxygen demand. Even small quantities of hydrogen sulfide can produce objectionable odors thereby necessitating that oxygen be mixed into the liquid. Industrial and municipal wastewater can also be treated by biological treatment techniques in which aerobic microorganisms convert contaminants into carbon dioxide gas and biomass. Sufficient oxygen must be provided to the aerobic organisms in order to carry out the necessary biological processes, chemical oxidation and/or fermentation processes.

Hydrogen gas can also be mixed with various liquids or liquid solid mixtures. For example, hydrogen gas can be used to saturate carbon-carbon double bonds and to reduce nitro and nitroso compounds in organic materials. Hydrogen gas can also be mixed into liquids present in vegetable oils processing, yeast production, vitamin C production, coal liquefaction, and the production of other types of unsaturated organic liquids. Chlorine gas can also be mixed with organic and inorganic liquids. Carbon monoxide gas can also be mixed with liquids containing organic compounds. In each of these examples, gas can be mixed into a liquid to dissolve and react with the liquid and/or liquid solid mixture to achieve various desired effects.

Conventional gas-liquid mixing systems can be typically classified as either surface aerators or diffused gas delivery systems. Diffused gas delivery systems that require gas compression typically comprise coarse, medium or fine bubble diffusers, liquid motive force venturi, jet type mixers that require large pumping systems, or agitators that utilize hollow members or spargers positioned to deliver pressurized gas to a mixing zone. Diffused gas delivery systems that do not require gas compression equipment typically comprise self-inducing systems such as venturi systems, vortex systems, and rotor/stator pitched blade turbine reactors.

In traditional systems, the delivery of gas to the desired liquid depth requires the use of fans, blowers, compressors, venturi or vortex systems to entrain the gas or compress the gas to a pressure equal to or greater than the static head at the desired liquid depth. Some traditional systems deliver compressed gas to a porous material, such as a fine hole matrix, mesh or membrane, that is permanently mounted near the bottom of a tank to disperse gas. However, these porous materials are easily fouled and can become blocked when placed in dirty liquids, liquids having a high particulate concentration or high soluble mineral concentration. Fouled materials reduce efficiency, increase operational energy cost, and increase bubble size. Porous materials can also stretch over time, thereby increasing hole size and bubble formation diameter, or harden, thereby causing increased pressure. Larger bubbles, caused by larger hole size, increased pressure or fouling, reduce the available gas-liquid surface area, which reduces the overall Standard Aeration Efficiency (SAE). The efficiency of fouled, blocked or stretched materials can drop to only 30% to 40% of their stated SAE in clean water.

To remedy the higher energy costs associated with fine bubble diffusers, additional energy, maintenance and/or replacement equipment is often needed. Periodic cleaning and maintenance often involve expensive and hazardous HCl injections into the diffuser system and/or the emptying of the aeration vessel followed by physical cleaning. Plastic membranes must be periodically changed, which increases labor, materials and processing costs associated with an aeration system shut-down during installation.

Non-mechanical diffused gas-liquid mass transfer systems, especially those using fine bubble diffusers, can deliver standard aeration efficiency (SAE) of 1.6 to 7 kilograms of dissolved oxygen (DO) from air per kilowatt-hour (kg/kWh) in clean water (SAE-ANSI/ASCE Standard 2-91). Their efficiency, even when clean, is frequently reduced by the intensity of the liquid mixing. The efficiency of a non-mechanical diffused gas-liquid mass transfer system in dirty or contaminated liquid can be only 40 to 50% of the clean water efficiency of the system.

Some examples of diffused aeration systems that are not based on fine bubble diffusers include traditional mechanical diffused aeration systems. Traditional diffused aerator systems can include a high speed prop mixer and a regenerative blower, such as the commercially available Aire-$O_2$ Triton®, large liquid mixers systems using a gas compressor, such as the draft tube aeration system commercially available from Philadelphia Mixers Corp., and jet aeration systems using a gas/liquid mixing jet, a liquid pump and a gas compression device, such as the system commercially available from US Filter Corporation.

Other traditional mechanical diffused aeration systems do not use a compressor, however, these systems require a vortex or a venturi system to create gas pockets at some depth below the surface of the liquid. Examples of these traditional mechanical diffused aeration systems include: U.S. Pat. No. 6,273,402 for a Submersible In-Situ Oxygenator, U.S. Pat. No. 6,145,815 for a System for Enhanced Gas Dissolution Having a Hood Positioned Over the Impeller with Segregating Rings, U.S. Pat. No. 6,135,430 for Enhanced Gas Dissolution, U.S. Pat. No. 5,916,491 for Gas-Liquid Vortex Mixer and Method, and U.S. Pat. No. 5,925,290 for Gas-Liquid Venturi Mixer, each of which are incorporated by reference herein.

In each of these traditional gas-liquid mixing systems that do not require a compressor, either liquid pumps or mixers are required to create high liquid velocities within the system. In order to introduce gas into the system, a velocity head must be created that is greater than the static head at the desired liquid depth at which the gas is introduced to the liquid. To overcome this static head, traditional systems require a liquid moving device, such as an axial or radial liquid pump or mixer, to accelerate a volume of liquid at a high velocity within a tank or holding area.

Conventional mechanical diffused air systems typically have an SAE of from 0.4 to 1.6 kg/kWh. Typically, low speed surface aerators give the highest SAE for mechanical aeration systems. These systems typically state an SAE of from 1.9 to 2.5 kg/kWh. However, surface aerators achieve low gas utilization and require large volumes of gas to be mixed with liquid, causing a high rate of off-gassing, which strips volatile organics from the liquid into the gas.

The present invention has been developed in view of the foregoing and to remedy other deficiencies of related devices.

SUMMARY OF THE INVENTION

The present invention provides a surface aerator for mixing gas and liquid. The surface aerator has an upwardly pumping impeller located within a draft tube. A flow diverter redirects pumped liquid from the impeller traveling in an upward direction to a radially outward direction where it impacts and aerates the remaining liquid in a vessel. A baffle extends radially at a shallow depth to a point beyond the impact area of the liquid to provide separation of the impact area from the remainder of the liquid in a tank and promote aeration.

An aspect of the present invention provides an apparatus for mixing gas and liquid comprising a draft tube at least partially submerged in a liquid an upwardly pumping impeller, a directional device positioned above the flow tube to redirect the liquid from upward direction to a radially outward direction whereby the liquid impacts upon itself at an impact area a baffle mounted to the exterior of the draft tube, the baffle extending radially at a shallow depth to a point beyond the impact area of the liquid.

These and other aspect will become more apparent from the following description.

DETAILED DESCRIPTION

Figure 1:
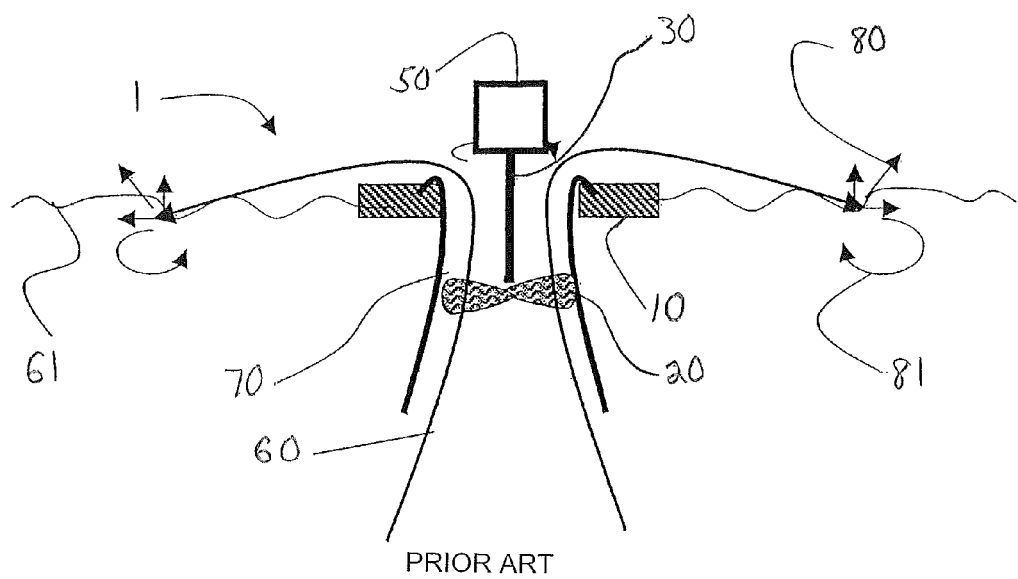
FIG. 1 illustrates a prior art version of a surface aerator.

Referring now to FIG. 1, a prior art mixer 1 is shown. The mixer 1 is a high-speed surface aerator mounted on a float 10.

The mixer 1 may also be a low-speed surface aerator. FIG. 1 illustrates a prior art version of a surface aerator type mixer 1. The mixer 1 includes an impeller 20 mounted on a drive 30. The drive 30 may include a motor, power converter, drive shaft, gearbox and driven shaft. A flow diverter 50 mounted above the impeller 20 redirects fluid flowing upward to a horizontal direction. The impeller 20 is located within a draft tube 70. The liquid flow path 60 shows that fluid is drawn from below the draft tube and accelerated to about 15-20 feet per second and is diverted from a vertical direction to a horizontal direction, ultimately impacting the surface of the water. At the point of impact, liquid splashes 80 project from the liquid surface 61. The high-speed liquid causes gas to liquid mass transfer and generally the liquid is pushed or jetted radially outward. Some of the radial force of the impacting liquid is consumed by eddies 81 at the point of impact. These reduce the radial flow out and create circular flows of already aerated water back to the point of impact. This reduces not only the total tank recirculation but it also reduces mass transfer by recycling already oxygenated water back to the point of impact.

Figure 2:
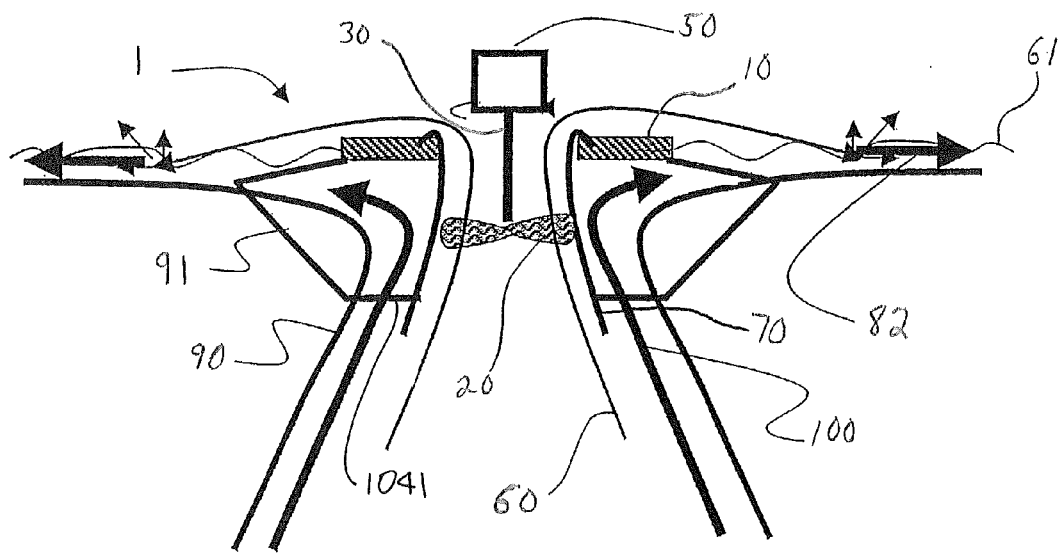
FIG. 2 illustrates a surface aerator having a flow directing baffle according to one embodiment of the present invention.

One embodiment of the present invention shown in FIG. 2 seeks to reduce these eddy currents 81 and provide a higher flow of lower concentration dissolved oxygen water back to the point of impact to increase oxygen transfer. Included in FIG. 2 is a flow directing baffle 90 mounted by braces 1041 to the exterior of the draft tube 70. The baffle 90 extends horizontally at a shallow depth below the surface of the liquid to a point beyond the impact point of the liquid flow 60. A shallow depth may be for example from about 2 inches to about 18 inches below the liquid surface 61, for example about 9 inches below the surface of the liquid. This decreases the ability for eddy currents 81 to form and forces a radially outward flow 82 of the liquid 60. The baffle 90 also provides a secondary liquid path 100 in which low concentration oxygen is drawn towards the point of impact by the radially outward flow 60 of the liquid. The baffle may extend vertically downward into the tank to an elevation about 1 to about 3 feet from the bottom of a tank or lagoon in which the mixer 1 is located, for example about 2 feet from the bottom of a tank or lagoon.

Figure 3:
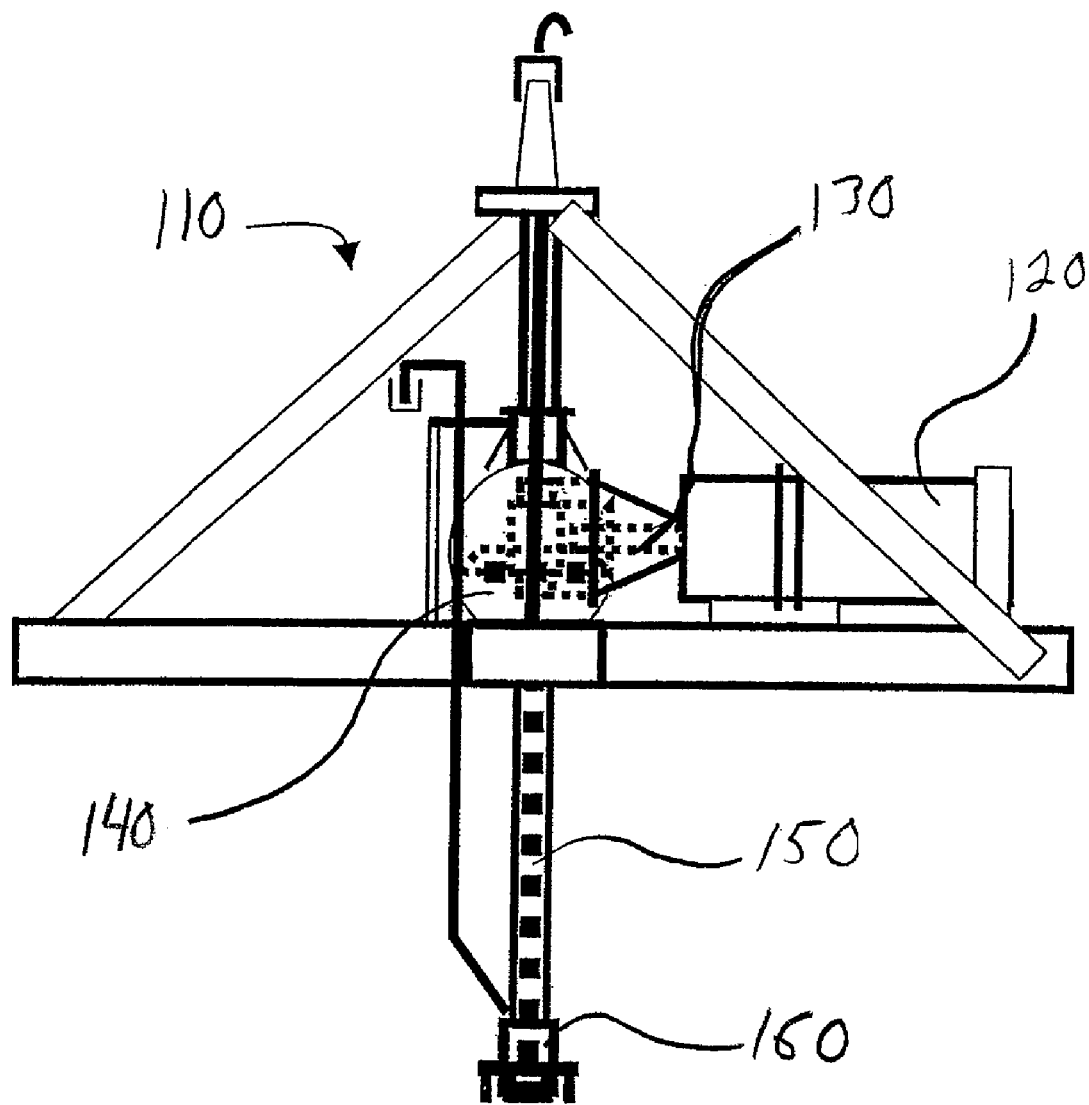
FIG. 3 illustrates a drive assembly for rotating the impeller according to one embodiment of the present invention.

FIG. 3 illustrates a drive 110 for the impeller 20 of the surface aerator according to one embodiment of the present invention. The drive may be a commercially available vehicle drive axle assembly. The drive axle assembly may include a drive motor 120 connected to a drive shaft 130 shown with hidden lines in FIG. 3. The drive shaft may connect to a pinion gear in a gearbox 140 by way of coupling or may be directly connected to a pinion gear. The gearbox 140 may have ring gear in communication with the pinion gear to provide rotation of a driven shaft 150. If side gears and spider gears are present in the gearbox 140 these gears are often locked/pinned on place or removed so a solid driven shaft may be used. The driven shaft 150 terminates with an output hub 160 which may bolt on to the impeller 20 (not shown). This type of gearbox is desirable for this particular application because it provides a right angle drive that is plentiful in supply and also cost efficient as compared to other industrial drives. Additional benefits of using a drive axle assembly may include a massive bearing on output hub coplanar with mass of impeller and common gear reduction ratios like 3:1, 7:1, which provide proper output speeds (rpm) for typical electric motors.

Figure 4:
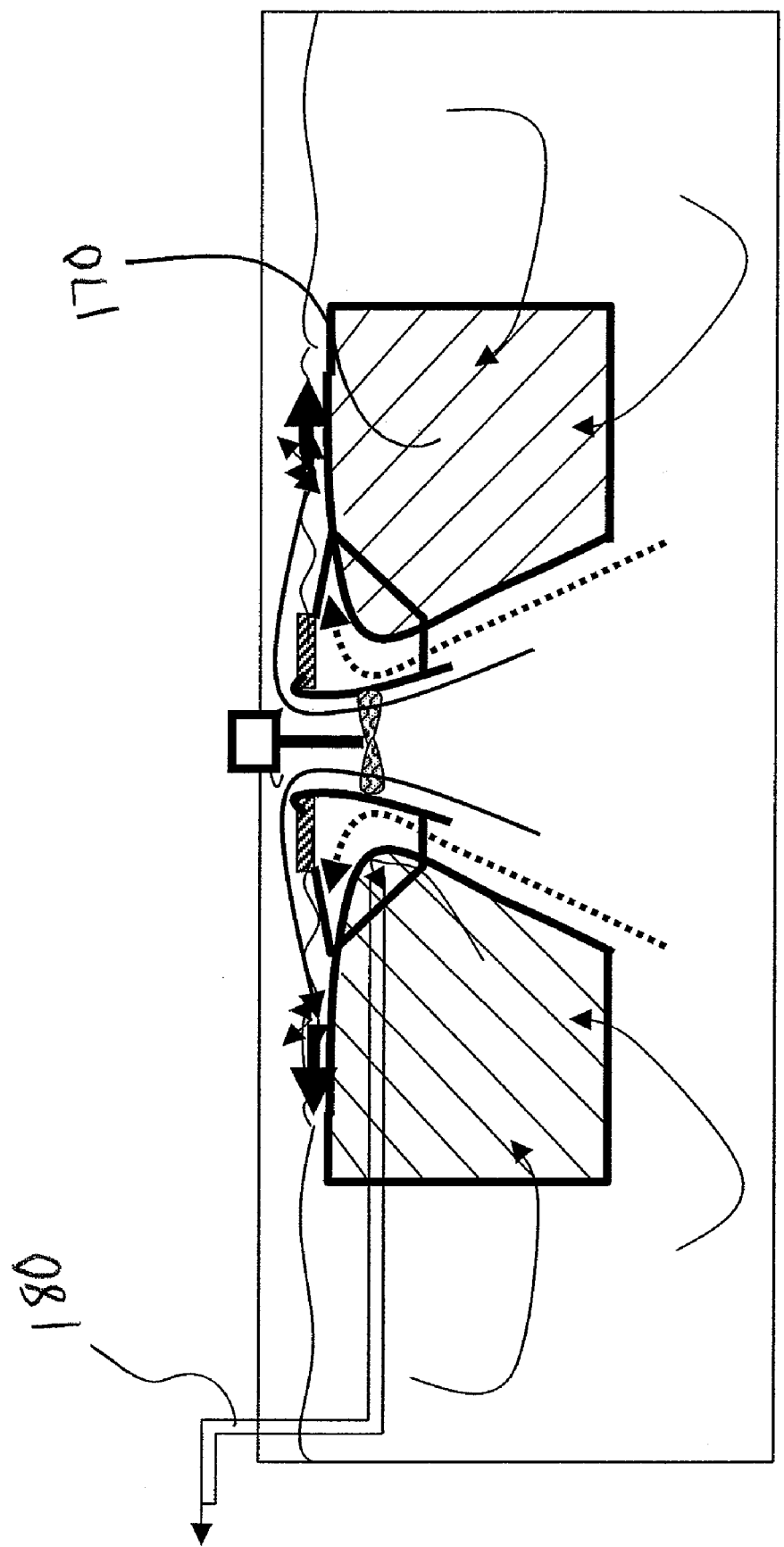
FIG. 4 illustrates a surface aerator with a fixed film bioreactor.

FIG. 4 illustrates a surface aerator having a fixed film bioreactor 170 attached to the baffle 90 according to one embodiment of the present invention. The bioreactor 170 uses the area below the baffle 90 to house fixed film media that promote biological growth. The aerated liquid laden with nutrients would flow in from the sides and bottom. After it passed trough the media a conduit 180 would provide means for conveying the liquid back to the aeration tank or to another treatment step. This embodiment of the present invention would be especially beneficial for Biological Nitrogen Removal (BNR).

Whereas particular embodiments of this invention have been described above for purposes of illustration, it will be evident to those skilled in the art that numerous variations of the details of the present invention may be made without departing from the invention as defined in the appended claims.

The invention claimed is:

1. An apparatus for mixing gas and liquid comprising:
 a surface aerator which draws liquid from a spray pool and radially discharges liquid into the spray pool comprising an impeller for moving the liquid and a draft tube around the impeller at least partially submerged in the liquid; and
 a baffle having a lower portion defining a secondary liquid path between the baffle and the draft tube and an upper portion extending radially outward at a shallow depth below the liquid to a location past a point of impact of the radially discharged liquid.

2. An apparatus for mixing gasses and liquids according to claim 1 wherein the baffle extends radially at a depth of about 2 inches to about 18 inches below a surface of the liquid.

3. An apparatus for mixing gasses and liquids according to claim 1 wherein the baffle extends radially at a depth of about 9 inches below a surface of the liquid.

4. An apparatus for mixing gasses and liquids according to claim 1 further comprising a tank which holds the liquid, wherein the baffle further comprises a vertical section extending to an elevation about 1 to about 3 feet from the bottom of a tank.

5. An apparatus for mixing gasses and liquids according to claim 1 further comprising a tank which holds the liquid, wherein the baffle further comprises a vertical section extending to an elevation about 2 feet from the bottom of a tank.

* * * * *